(12) United States Patent
Backers

(10) Patent No.: US 8,153,173 B2
(45) Date of Patent: Apr. 10, 2012

(54) FEEDSTUFF

(75) Inventor: Thomas Backers, Rosenberg (DE)

(73) Assignee: J. Rettenmaier & Sohne GmbH + Co. KG, Rosenberg (DE)

( * ) Notice: Subject to any disclaimer, the term of this patent is extended or adjusted under 35 U.S.C. 154(b) by 508 days.

(21) Appl. No.: 10/416,389

(22) PCT Filed: Nov. 13, 2001

(86) PCT No.: PCT/EP01/13117
§ 371 (c)(1),
(2), (4) Date: Sep. 9, 2003

(87) PCT Pub. No.: WO02/39827
PCT Pub. Date: May 23, 2002

(65) Prior Publication Data
US 2004/0047897 A1 Mar. 11, 2004

(30) Foreign Application Priority Data
Nov. 14, 2000 (DE) ................. 100 56 345

(51) Int. Cl.
*A23L 1/0534* (2006.01)
*A23L 1/29* (2006.01)
(52) U.S. Cl. ............ 426/2; 426/615; 426/636; 426/640; 426/648
(58) Field of Classification Search ............ 426/2, 635, 426/575, 573, 805, 807
See application file for complete search history.

(56) References Cited

U.S. PATENT DOCUMENTS

| 3,511,910 A | * | 5/1970 | Halleck ............................ 514/54 |
| 4,089,981 A | * | 5/1978 | Richardson .................... 426/104 |
| 4,283,400 A | * | 8/1981 | von Bittera et al. .......... 514/250 |

FOREIGN PATENT DOCUMENTS

| DE | 144 862 A | 11/1980 |
| EP | 0 091 767 A | 10/1983 |
| EP | 0 614 615 A | 9/1994 |
| JP | 51 129796 | 11/1976 |
| JP | 10 127232 A | 8/1998 |

OTHER PUBLICATIONS

JRS, J. Rettenmaler USA, FIB. (http://jrs.venux.net/applications/pet food.vml (no date).*
Sodium Alginate: www.newdruginfo.com/pharmacopeia/usp28/v28230/usp28nf23s0_m75750.htm, no date provided. Printed Oct. 20, 2008.*
Gerdes, E. et al. "Fibers designed by nature", JRS Filtration & Separation, Dec. 1997, vol. 34, No. 10, pp. 1-6.*
"Effets Nutritionelles de l'incorporation de cellulose purifiee croissance-finition", Y. Henry et al., Bd. 18, NR. 4, 1969, Seiten 371-384.

* cited by examiner

*Primary Examiner* — Helen F Heggestad
(74) *Attorney, Agent, or Firm* — Fay Sharpe LLP

(57) ABSTRACT

The invention relates to feedstuff for economically useful animals such as, for example, chicken, pigs, calves and fish that are being raised. The inventive feedstuff contains functional additives. The feedstuff contains a pure finely divided cellulose additive and optionally a prebiotic additive.

11 Claims, No Drawings

FEEDSTUFF

The invention concerns a function-improving, additive-containing feedstuff for domestic animals as set forth more fully herein.

The raising of animals today for the most part no longer takes place in a natural environment, but rather in the form of large-scale animal raising in which many animals are maintained in close conditions without free access to the out of doors. While this aids in speeding the animal raising process, it on the other hand brings with it many new specific problems.

Numerous additives for feedstuffs for such animals are known. Despite these additives and despite the high energy density achievable in feeds, the yield of the animals continues to be capable of being improved. Yield should be understood to mean on the one hand the pure weight ratio between the feedstuff used and the dressed weight of the animals, but features such as quality, in particular low quantity of fat in the meat and reduction of diseases and mortality of the animals and improvement of the state of the animals are also included in this concept. A further aspect is the problem of stall climate which with the large number of animals per square meter of area of the stall frequently is characterized by a very foul smelling, ammonia-containing atmosphere which impairs the air passages and lungs of the animals and represents considerable environmental stress upon bringing out the stall litter or liquid manure. Corresponding problems occur in pisciculture basins.

Confirmed Copy

The invention is based on the task of improving the known feeds for the raising of existing domestic animals.

This task is solved through use of the function-improving, additive-containing feedstuff as disclosed herein.

The feedstuff thus comprises the actual nutrient-bearing feed and the additives. The nature and composition of the feed fluctuates and is adapted by the manufacturers, often even by the commercial animal growers, according to the available knowledge and experience for the particular types of animals on the status of feed supplies which also change seasonally. To this extent a fixed composition of the actual feed thus is not specified.

But of concern here are the function-improving additives.

The additive of pure cellulose improves, as was surprisingly found and as extensive experiments which have been carried out have confirmed, the energy absorption specifically in the case of high energy density of the feed. As a result of the insoluble fibers, the stomach and intestinal activities are stimulated and mycotoxins are bound. In order to achieve the same energy results based on weight, about 10% less feed is necessary. The leg and breast muscles of test poultry specimens were more pronounced than those of the comparison animals which results in a higher percentage of valuable parts.

A further important factor is the reduction of ammonia content in the liquid manure. This is attributable to the fact that the cellulose additive functions as in ballast material in human nutrition and the animals as a result obtain a more effective and healthier intestinal flora. As a result, more nitrogen in turn is resorbed from the amino acids of the feed and is synthesized into protein. As a result, the animals grow more rapidly and in addition have a higher percentage of lean meat, which is of importance for the reduction of cholesterol content of human nutrition. Thus the meat quality is improved. The animals are pinker. The iron resorption is improved. The animals are more animated.

The portion of nitrogen which goes into increased protein synthesis can no longer be excreted as ammonia; the stall air remains far less stressed. The results of measurements are that the $NH_3$ content in a chicken house operated with the feedstuff in accordance with the invention was reduced to 2 ppm in comparison with 15 ppm in the case of a chicken house operated with a conventional feedstuff. As a result of the improvement of the stall atmosphere, the animals are more resistant to respiratory diseases and heart-circulatory diseases, as a result of which medication is correspondingly reduced or becomes unnecessary, resulting in corresponding savings.

The reduction of the $NH_3$ content in the liquid manure reduces the field area necessary for it to be spread on.

The feedstuff additive, as already mentioned, acts as an additive of insoluble ballast material. It might be asked whether the aforementioned effects are not also achieved with any other insoluble crude fiber material. The experiments showed, however, that other crude fibers have side effects such as the binding of nutrients, the reduction of mineral availability, the shifting of Na—Mg equilibrium and the like, and that they are also not in a position to bind ammonium and mycotoxins reliably and in the same scope as pure cellulose.

The best effect is achieved if the additive essentially consists of fibrous powder cellulose which advantageously should contain a portion of at least 50% by weight or even at least 90% by weight of α-cellulose and can be produced from grain fiber. A cellulose product that has proven to be suitable is Arbocel BWW 40 of the applicant with fiber lengths of 50 μm to 250 μm.

An important further development of the invention is the addition of the additive of pure cellulose in combination with an additive of prebiotic agent. The insoluble crude fiber source cellulose generally stimulates intestinal activity. It now is combined with a soluble component which acts as a substrate for the microorganisms of the intestinal flora and to an extent serves as nutrient for them. As a result, the advantageous effect of the cellulose is further promoted.

Found to be especially advantageous as a combined additive is a prebiotic agent which is an alga preparation and can be a sodium alginate in solution which can be obtained from the brown alga Ascophyllum nodosum.

The algal preparation should have a content of at least 5% by weight of bioavailable polyuronic acid in order to have an adequate effect.

The portion of prebiotic agent in response to the total quantity of the additive of pure cellulose and to the additive of prebiotic agent should be 6% to 28% by weight.

In one embodiment, the additive of finely-divided cellulose including the prebiotic agent should be present in a portion of 0.2% to 18% by weight of the feedstuff, with quantity portions in the lower part of this range being sufficient for most kinds of animals.

The feedstuff is primarily intended for commercially grown animals whch are strongly concentrated, i.e., are grown in tight quarters under unnatural living conditions, i.e., in growing cages, pisciculture facilities, and the like.

A first important application example of the feedstuff according to the invention is feed for domestic poultry in particular chicken feed.

The portion of the additive according to the invention present can be 0.2% to 3.0% by weight of the feedstuff.

A further important application is the use of the feedstuff according to the invention as swine feed with the total quantity of the additive of pure cellulose and of additive of a prebiotic agent should be 0.3% to 2.5% by weight of the feedstuff.

The portion of prebiotic agent in respect to the total quantity of the additive of pure cellulose and to the additive of prebiotic agent according to claim 11 should be 6% to 28% by weight.

According to claim 12, the additive of finely-divided cellulose including the prebiotic agent should be present in a portion of 0.2% to 18% by weight of the feedstuff, with quantity portions in the lower part of this range being sufficient for most kinds of animals.

The feedstuff is primarily Intended for commercially grown animals which are strongly concentrated, i.e., are grown in tight quarters under unnatural living conditions, i.e., in growing cages, pisciculture facilities, and the like.

A first important application example of the feedstuff according to the invention is feed for domestic poultry (claim 15) in particular chicken feed (claim 16).

The portion of the additive according to the invention present can be 0.2% to 3.0% by weight of the feedstuff (claim 14).

A further important application is the use of the feedstuff according to the invention as swine feed (claim 18) with the total quantity of the additive of pure cellulose and of additive of a prebiotic agent should be 0.3% to 2.5% by weight of the feedstuff (claim 19).

The feedstuff according to the invention has advantages both for brood sows as well as for raising pigs and fattening swine. The cellulose motivates and stimulates the digestive tract, binds liquids, and produces better fecal consistency. In trials it was observed that the sows eat more and like the food more. In the trials, the already mentioned feedstuff combined with algae preparation was used. The alga preparation nourishes the intestinal flora and hinders the growth of toxic organisms in the intestinal tract. Thus the intestinal flora becomes healthier and can resorb the energy of the feed better. To an extent a balanced diet is offered in order to absorb the available energy of the feed better. A brood sow should pass traces of the algae preparation even through her milk to the piglets. Thus a more healthy intestinal flora is provided from the start which increases the feed utilization of the pigs, makes the pigs more stable, and hinders diarrhea illness in the pigs.

Diarrhea illnesses in pigs is a key problem which often is solved with zinc oxide. This agent today is forbidden as an additive to feedstuffs because it does not break down when spread and contaminates the environment. In addition, it has nutritional physiological drawbacks. As a result of zinc oxide, the intestinal villi of the young animals is strongly demolished which while it for a time prevents diarrhea, damages the intestinal villi so greatly that less feed can be used. The fattening operations then receive quasi pre-damaged pigs. The feedstuff according to the invention in contrast simultaneously develops good intestinal flora in the pigs and is in a position to make the animals more stable. The fecal consistency of the pigs is improved. Also in the case of high outside temperatures, a good intake of feed takes place. In the case of feeding with the feedstuff according to the invention, the pigs have better health and a strongly improved, stable daily increase as a result of which the pigs being can be separated from the sow after a shorter period of time. Thus the sow is less stressed, loses less weight, and recovers more quickly; she can be bred again earlier. As a result, the productivity increases.

As a result of the better health and resistance of the animals, the costs for medicating and immunizing drops noticeably.

Furthermore an increased receptivity of the sows can be observed which reduces the rate of coming back into heat (failed inseminations).

Thus there are several indirect advantages of the feedstuff according to the invention which more than justify its cost.

Another important area for the invention is feed for commercial fish with a total quantity of the additive of 0.3% to 6% by weight being expedient.

In so doing, an important effect discovered in trials is that through the addition of powder cellulose to feed for commercial fish, the feces transitions from a fluid into a largely solid state and in so-called pool farming in pisciculture basins in which no or only a small amount of running water is present, it can be sedimented and drawn off close to the bottom. The water quality benefits from this. The fish thus no longer live in water that they themselves contaminate and demonstrate better health. Functioning best in this connection are long fibered cellulose types with an (X-cellulose content of over 80% by weight, for example type FIF of Rettenmeier & Sohne GmbH & Co. in 73494 Rosenberg with average fiber lengths in the range of around 2000 μm.

A further important field of application of the invention is the feeding of calves.

In the case of feeding with the feedstuff according to the invention, the calves absorb the energy better and are more healthy and resistant. But if silage or other sources of crude fiber is added to the feedstuff, as a result of the higher iron contents of conventional sources of crude fiber, the meat quickly becomes red and loses the desired bright color. In addition, cellulose could be the only crude fiber concentrate that can be mixed into the calf milk without an additional production step and/or feeding step.

Other application fields of the feedstuff supplied with an additive of pure cellulose or of cellulose enhanced with prebiotic substances are fur-bearing animals, rabbits, and other rodents as well as lab animals.

Two trial examples concerning the effect of an additive of pure, finely divided, fibrous powder cellulose from the area of broiler growing are given below.

TRIAL EXAMPLE 1

In this case there was a dressed weight of 35 to 41 kg chicken/sq. meter with the use of the feedstuff according to the invention compared with a result of 28 to 33 kg chicken/sq. meter with conventional feeding. The EWW index with the invention was at 241 to 288, while normally 220 to 240 are achieved. It was possible to reduce mortality of the chickens from 6% to 2.36% and in other cases to 0.4% to 0.6%. Feed conversion rate was 1.89, previously 2.06. The broilers had an average ending weight of around 2.1 kg. This was based on 80,000 broilers of the Hubberd breed which were kept in a density of 17 birds/sq. meter.

With a conventional chicken house, the additional revenue resulting from higher daily gain of the birds was around DM 6000.00, compared with the additional costs resulting from the feedstuff in accordance with the invention in the amount of DM 3000.00. An improvement was found not only purely on the basis of weight, but also on the basis of quality.

TRIAL EXAMPLE 2

In this trial example, the effect of the additive of pure finely-divided fibrous powder cellulose of the type Arbocel BWW 40 to a feedstuff for growing broilers was investigated.

Table 1 shows the composition of the different feedstuffs. C is the control without the addition of Arbocel BWW 40, while E1 to E4 are trial feedstuffs with various percentages of Arbocel BWW 40.

TABLE 1

Calculated Composition of Trial Feedstuffs (% by weight)

| Nutrients | Trial feedstuffs[1] | | | | |
|---|---|---|---|---|---|
| | C | E1 | E2 | E3 | E4 |
| ME, Mj/kg | 13.32 | 13.31 | 13.32 | 13.31 | 13.32 |
| Gross protein | 21.02 | 21.03 | 21.01 | 21.00 | 21.01 |
| Gross fiber | 3.00 | L [2] | M [3] | H [4] | L-NMS [5] |
| Lysine | 1.31 | 1.31 | 1.31 | 1.31 | 1.31 |
| Methionine | 0.53 | 0.53 | 0.53 | 0.53 | 0.53 |
| Met + Cys | 0.89 | 0.89 | 0.89 | 0.89 | 0.89 |
| Calcium | 0.90 | 0.90 | 0.90 | 0.90 | 0.90 |
| Available phosphorus | 0.48 | 0.48 | 0.48 | 0.48 | 0.48 |
| Salt | 0.39 | 0.39 | 0.39 | 0.39 | 0.39 |

[1] C = Control feedstuff (without Arbocel BWW 40) E1, 2, 3, 4 = trial feedstuffs
[2] L = Slight addition of Arbocel BWW 40
[3] M = Moderate addition of Arbocel BWW 40
[4] H = Higher addition of Arbocel BWW 40
[5] L = NMS Slight addition of Arbocel BWW 40 in a naturally stabilizing mixture Table 2 shows the effect of the feed on various performance values.

TABLE 2

Performance Indices of Broilers (at least 26,000 per group)

| Group [1] | Days of life (d) | Average body weight (g) | Feedstuff used (kg/kg) Body weight | Weight gain | Mortality % | EEI [2] |
|---|---|---|---|---|---|---|
| C | 0-21 | 815.29[3] | 1.29 | 1.36 | 0.00 | 286 |
| | | 105.85[4] | 0.05 | 0.05 | | 33 |
| | 0-42 | 2201.80 | 1.79 | 1.83 | 4.76 | 286 |
| | | 229.97 | 0.21 | 0.21 | | 42 |
| E1 | 0-21 | 857.00 | 1.27 | 1.34 | 0.00 | 304 |
| | | 75.10 | 0.02 | 0.02 | | 18 |
| | 0-42 | 2348.50 | 1.86 | 1.68 | 0.00 | 333 |
| | | 252.12 | 0.06 | 0.03 | | 11 |
| E2 | 0-21 | 802.06 | 1.29 | 1.36 | 0.00 | 280 |
| | | 90.48 | 0.03 | 0.04 | | 32 |
| | 0-42 | 2266.24 | 1.68 | 1.71 | 0.00 | 316 |
| | | 218.76 | 0.04 | 0.05 | | 9 |
| E3 | 0-21 | 761.76 | 1.27 | 1.35 | 0.00 | 269 |
| | | 152.41 | 0.05 | 0.05 | | 23 |
| | 0-42 | 2257.60 | 1.67 | 1.70 | 0.00 | 317 |
| | | 302.85 | 0.05 | 0.06 | | 13 |
| E4 | 0-21 | 834.67 | 1.27 | 1.35 | 0.00 | 295 |
| | | 74.68 | 0.04 | 0.04 | | 12 |
| | 0-42 | 2399.38 | 1.85 | 1.68 | 0.00 | 341 |
| | | 214.07 | 0.02 | 0.02 | | 8 |

[1] C = Control group E1, 2, 3, 4-trial groups
[2] EEI = European Efficiency Index
[3] Mean
[4] Standard deviation Table 3 shows the percentages of the various body parts of the broiler which realize different prices.

TABLE 3

Dressed analysis (%) of Broilers
(Body weight before slaughter = 100%)

| Specification | Group [1] | | | | |
|---|---|---|---|---|---|
| | C | E1 | E2 | E3 | E4 |
| Dressed carcass yield | 74.49[2] | 75.53 | 74.72 | 74.64 | 75.71 |
| | 1.14[3] | 1.15 | 0.48 | 1.85 | 1.03 |
| Parts of the dressed carcass Giblets: | | | | | |
| Liver | 2.02 | 2.21 | 2.35 | 2.18 | 2.17 |
| | 0.13 | 0.21 | 0.32 | 0.15 | 0.28 |
| Gizzard | 1.88 | 1.67 | 1.95 | 2.12 | 1.79 |
| | 0.33 | 0.22 | 0.33 | 0.41 | 0.24 |
| Heart | 0.47 | 0.45 | 0.50 | 0.52 | 0.47 |
| | 0.05 | 0.04 | 0.08 | 0.06 | 0.05 |
| Breast muscles | 21.87 | 23.35 | 21.418 | 22.32 | 22.98 |
| | 1.43 | 0.87 | 1.09 | 0.45 | 1.32 |
| Leg muscles | 21.62 | 23.55 | 21.77 | 23.55 | 22.81 |
| | 1.84 | 1.59 | 1.61 | 1.54 | 0.91 |
| Total muscle meat | 43.49 | 46.90* | 43.25 | 45.87 | 45.79 |
| | 2.38 | 1.02 | 0.99 | 1.46 | 1.29 |
| Fat | 3.71 | 2.13* | 3.80 | 1.90* | 2.51 |
| | 1.20 | 0.95 | 0.47 | 0.52 | 0.65 |

[1] C = Control group E1, 2, 3, 4-trial groups
[2] Mean
[3] Standard deviation
* P = 0.05

Table 4 represents a cost-profit study prepared on this basis which was obtained on the basis of the feed results and the sales prices which can realized. It can be seen in the last two lines of Table 4 that despite the additional costs for the Arbocel BWW 40, a clear additional profit was realized for the broilers of trial groups E1 through E4 in comparison with the broilers of the control group.

TABLE 4

Cost/Profit Study

| Specification | Group (1) | | | | |
|---|---|---|---|---|---|
| | C | E1 | E2 | E3 | E4 |
| Total profit [2] | 59.59 | 66.74 | 64.40 | 64.17 | 68.17 |
| Feed costs | 33.85 | 36.10 | 35.78 | 34.45 | 37.39 |
| Incidental costs [3] | 14.50 | 14.50 | 14.50 | 14.50 | 14.50 |
| Total costs [4] | 48.35 | 50.60 | 50.28 | 48.95 | 51.89 |
| Net profit [5] | 11.24 | 16.14 | 14.12 | 15.22 | 16.28 |
| Net profit per broiler | 0.56 | 0.77 | 0.67 | 0.72 | 0.78 |
| Difference | 0.00 | 0.21 | 0.11 | 0.16 | 0.22 |

[1] C = Control group E1, 2, 3, 4-trial groups
[2] Total profit on the sale of the broilers
[3] Incidental costs Chicks, energy, litter, labor, medications
[4] Total costs = Feed costs + incidental costs
[5] Net profit = Total profit − total costs
[6] Difference = Net profit per broiler in the trial groups less net profit per broiler in the control group

The invention claimed is:

1. A method of commercially raising domestic animals that are strongly concentrated under conditions that are not natural, said method stimulating stomach and intestinal activities of the animals being raised to reduce mortality of the animals being raised, said method comprising:
   confining said animals in a cage or piscicultural facility under conditions that are strongly concentrated and not natural, said animals selected from the group consisting of poultry, chicken, shoats, pigs, calves and commercial fish; and, feeding said confined animals a feedstuff comprising a function-improving additive for reducing mortality in the animals being raised, said function-improving additive itself comprising insoluble pure fibrous powder cellulose, said insoluble pure fibrous powder cellulose comprising fiber lengths of 50 μm to 2000 μm and containing at least 50% by weight of α-cellulose;

wherein:

said step of feeding comprises feeding said confined animals said feedstuff in which said function-improving additive is 0.2%-3.0% by weight of the feedstuff when said confined animals being fed are at least one of poultry, chicken, shoats, pigs, calves;

said step of feeding comprises feeding said confined animals said feedstuff in which said function-improving additive is 0.3%-6.0% by weight of the feedstuff when said confined animals being fed are commercial fish.

2. The method according to claim 1, wherein said insoluble pure fibrous powder cellulose of said function-improving additive contains at least 80% by weight of α-cellulose.

3. The method according to claim 1, wherein the function-improving additive further comprises a prebiotic agent, and wherein the function-improving additive of insoluble pure fibrous powder cellulose and prebiotic agent together is: (i) a total of 0.2% to 3.0% by weight of the feedstuff when said step of feeding comprises feeding said feedstuff to one of poultry, chicken, shoats, pigs, calves; (ii) 0.3% to 6.0% by weight of the feedstuff when said step of feeding comprises feeding said feedstuff to commercial fish.

4. The method according to claim 3, wherein the prebiotic agent comprises an algal preparation present in a quantity of 6% to 28% by weight of the function-improving additive.

5. The method according to claim 4, wherein the algal preparation comprises at least 5% by weight of bioavailable polyuronic acid.

6. A method of commercially raising pigs comprising:

confining pigs in a cage under conditions that are strongly concentrated and not natural;

stimulating stomach and intestinal activities of the confined pigs to reduce mortality and reduce diarrhea in the confined pigs by feeding said confined pigs a feedstuff comprising a function-improving additive for reducing mortality in the confined pigs, said function-improving additive comprising:
  (i) insoluble pure fibrous powder cellulose comprising fiber lengths of 50 μm to 250 μm and containing at least 50% by weight of α-cellulose;
  (ii) a prebiotic agent, with the prebiotic agent being an algal preparation present in a quantity of 6% to 28% by weight of the function-improving additive;

wherein said function-improving additive, including the insoluble pure fibrous powder cellulose and prebiotic agent, is a total of 0.3% to 2.5% by weight of the feedstuff.

7. The method according to claim 6, wherein the algal preparation comprises at least 5% by weight of bioavailable polyuronic acid.

8. A method of commercially raising fish comprising:

confining commercial fish in a piscicultural facility under conditions that are strongly concentrated and not natural;

stimulating stomach and intestinal activities of the confined fish to reduce mortality of the confined fish by feeding said confined fish a feedstuff comprising a function-improving additive for reducing mortality in the confined fish, said function-improving additive comprising:
  (i) insoluble pure fibrous powder cellulose comprising fiber lengths of about 2000 μm and containing over 80% by weight of α-cellulose;
  (ii) a prebiotic agent, with the prebiotic agent being an algal preparation present in a quantity of 6% to 28% by weight of the function-improving additive;

wherein said function-improving additive, including the insoluble pure fibrous powder cellulose and prebiotic agent, is a total of 0.3% to 6.0% by weight of the feedstuff.

9. The method according to claim 8, wherein the algal preparation comprises at least 5% by weight of bioavailable polyuronic acid.

10. A method of commercially raising chickens or calves comprising:

confining chickens or calves in a cage under conditions that are strongly concentrated and not natural;

stimulating stomach and intestinal activities of the confined chickens or calves to reduce mortality and reduce diarrhea by feeding said confined chickens or calves a feedstuff comprising a function-improving additive for reducing mortality in the confined chickens or calves, said function-improving additive comprising:
  (i) insoluble pure fibrous powder cellulose comprising fiber lengths of 50 μm to 250 μm and containing at least 50% by weight of α-cellulose;
  (ii) a prebiotic agent, with the prebiotic agent being an algal preparation present in a quantity of 6% to 28% by weight of the function-improving additive;

wherein said function-improving additive, including the insoluble pure fibrous powder cellulose and prebiotic agent, is a total of 0.2% to 3.0% by weight of the feedstuff.

11. The method according to claim 10, wherein the algal preparation comprises at least 5% by weight of bioavailable polyuronic acid.

* * * * *